_United States Patent_ [19]

Yu et al.

[11] Patent Number: 5,037,951
[45] Date of Patent: * Aug. 6, 1991

[54] PROCESS FOR PRODUCING BIPHENYLENE SULFIDE POLYMER

[75] Inventors: Michael C. Yu; Harold D. Yelton, both of Bartlesville, Okla.

[73] Assignee: Phillips Petroleum Company, Bartlesville, Okla.

[*] Notice: The portion of the term of this patent subsequent to Nov. 13, 2007 has been disclaimed.

[21] Appl. No.: 414,120

[22] Filed: Sep. 28, 1989

[51] Int. Cl.$^5$ .............................................. C08G 75/14
[52] U.S. Cl. ................................... 528/388; 528/481; 528/499
[58] Field of Search .......................................... 528/388

[56] References Cited

U.S. PATENT DOCUMENTS

| 3,354,129 | 11/1967 | Edmonds, Jr. et al. | 260/79 |
| 3,396,110 | 8/1968 | Hill, Jr. et al. | 252/42.1 |
| 4,376,196 | 3/1983 | Sherk et al. | 528/481 |
| 4,588,789 | 5/1986 | Scoggins et al. | 525/537 |
| 4,654,410 | 3/1987 | Kashiwame et al. | 528/388 |
| 4,837,294 | 6/1989 | Ichikawa et al. | |

FOREIGN PATENT DOCUMENTS 231030 10/1986 Japan .................................. 528/388

_Primary Examiner_—Lewis T. Jacobs
_Assistant Examiner_—David W. Woodward
_Attorney, Agent, or Firm_—Laney, Dougherty, Hessin & Beavers

[57] ABSTRACT

An improved process for producing biphenylene sulfide comprising reacting difluorobiphenyl with an alkali metal sulfide in a polar organic compound. The resulting polymer has a high melting point and fiber composites formed therefrom have excellent mechanical properties.

17 Claims, No Drawings

PROCESS FOR PRODUCING BIPHENYLENE SULFIDE POLYMER

BACKGROUND OF THE INVENTION

1. Field of the Invention

The present invention relates to an improved process for producing biphenylene sulfide polymer.

2. Description of the Prior Art

Because of their outstanding chemical, heat and electrical insulation resistance as well as their superior rigidity when compared to other thermoplastics, poly(arylene sulfide) resins have found favor for forming reinforced plastic composites.

A particularly suitable poly(arylene sulfide) resin for forming fiber-reinforced composites, both by injection molding and pultrusion techniques, is poly(phenylene sulfide) resin. Fiber-reinforced (phenylene sulfide) resin composites exhibit excellent mechanical properties and are utilized in a great variety of products. However, in product applications where very high temperature exposure is required, e.g., temperatures in the range of from about 400° F. to about 600° F., poly(phenylene sulfide) composites generally do not maintain high rigidity and strength. The same problem is experienced in using poly(phenylene sulfide) resin in coatings exposed to high temperatures as well as in other high temperature applications.

A poly(arylene sulfide) resin which has heretofore been found to have a very high melting point and to be suitable for use at very high temperatures is comprised of biphenylene sulfide polymers. Poly(biphenylene sulfide) resin retains its hardness at temperatures as high as about 700° F. whereas poly(phenylene sulfide) resin loses hardness at temperatures in the range of from 300° F. to 400° F. In addition to having a high melting point, poly(biphenylene sulfide) resin has a high retention of mechanical properties at elevated temperatures. For example, composites comprised of reinforcing fibers in a continuous matrix of poly(biphenylene sulfide) resin generally maintain full rigidity and strength (compared to their rigidity and strength at room temperature) up to about 400° F. At 600° F., the composites generally retain about 80% and 35% of their room temperature flexural modulus and flexural strength, respectively.

Heretofore, biphenylene sulfide polymer has been prepared from sodium sulfide and either 4,4'-dichlorobiphenyl or 4,4'-dibromobiphenyl. The resin prepared from 4,4'-dichlorobiphenyl is superior to that which is prepared from 4,4'-dibromobiphenyl. However, the use of polychlorinated biphenyl such as 4,4'-dichlorobiphenyl has been discontinued as a result of its having been found to be hazardous to the environment and human health.

By the present invention, an improved process for producing biphenylene sulfide polymer which has a higher melting point as compared to biphenylene sulfide resin formed from sodium sulfide and 4,4'-dibromobiphenyl is provided. As a result, fiber reinforced composites and coatings formed using the polymer have better mechanical properties at elevated temperatures.

SUMMARY OF THE INVENTION

Biphenylene sulfide polymer is produced by reacting 4,4'-difluorobiphenyl with an alkali metal sulfide in a polar organic solvent at an elevated temperature for a time sufficient to form the polymer. The polymer has a high melting point and composites, coatings and the like formed therefrom have excellent retention of mechanical properties when exposed to high temperatures.

In a preferred embodiment, the alkali metal sulfide is sodium sulfide, the polar organic solvent is N-methyl-2-pyrrolidone and the polymerization reaction is carried out at an elevated temperature in the range of from about 260° F. to about 840° F. for a time period in the range of from about 1 hour to about 8 hours.

A particularly preferred process of the invention comprises reacting 4,4'-difluorobiphenyl with an alkali metal sulfide in a polar organic compound at an elevated temperature for a time sufficient to form the polymer, washing the polymer with hot water, filtering the polymer to remove the wash water, and air drying the polymer at a temperature below its melting point. The dried polymer can be milled to a reduced particle size and has enhanced processing properties.

It is, therefore, a general object of the present invention to provide an improved process for producing biphenylene sulfide polymer.

A further object of the present invention is the provision of a process for producing biphenylene sulfide polymer having a high melting point as well as improved processing properties whereby fiber reinforced composites, coatings, and the like having good mechanical properties at high temperatures can be formed therefrom.

Other objects, features and advantages of the present invention will be readily apparent to those skilled in the art upon a reading of the description of preferred embodiments which follows.

DESCRIPTION OF PREFERRED EMBODIMENTS

In accordance with the present invention biphenylene sulfide polymer is produced by reacting 4,4'-difluorobiphenyl with an alkali metal sulfide in a polar organic compound at an elevated temperature and for a sufficient time to form the polymer.

A process of preparing polymers from aromatic compounds is described in U.S. Pat. No. 3,354,129 issued Nov. 21, 1967, which is incorporated herein by reference. The process generally comprises the steps of reacting at least one polyhalo-substituted aromatic compound wherein the halogen atoms are attached to ring carbon atoms with an alkali metal sulfide in a polar organic compound. The polar organic compound is one that will substantially dissolve both the alkali metal sulfide and the polyhalo-substituted aromatic compound. In Example XVIII of U.S. Pat. No. 3,354,129, a preparation of biphenylene sulfide polymer is described wherein dibromobiphenyl was reacted with sodium sulfide in N-methyl-2-pyrrolidone solvent. The resulting solution was dehydrated by overhead distillation after which the dibromobiphenyl was added. The solution was reacted at 572° F., and the resulting polymer was washed and dried.

In accordance with the present invention, biphenylene sulfide polymer is produced utilizing the process of U.S. Pat. No. 3,354,129, or the equivalent, except that the alkali metal sulfide is reacted with 4,4'-difluorobiphenyl in a polar organic solvent. The alkali metal sulfide is preferably sodium sulfide, and while hydrated sodium sulfide can be utilized, it is more preferable to form the sodium sulfide in situ by dissolving sodium hydrosulfide and sodium hydroxide in the polar solvent. The resulting solution is heated and the lesser amount of water formed is removed by distillation. The preferred polar organic compound is N-methyl-2-pyrrolidone, and the reaction is carried out at a temperature in the range of from about 260° F. to about 840° F., preferably from about 480° F. to about 570° F. for a time period in the range of from about 1 hour to about 8 hours. Most preferably, the reactants are maintained at a temperature of about 480° F. for about one hour, followed by increasing the temperature to about 540° F. and maintaining it for an additional two hours.

In order to improve the melt viscosity and other processing properties such as reducing the off gas during processing and the like, the crude polymer product is preferably washed with hot water at a temperature in the range of from about 250° F. to about 450° F., most preferably from about 300° F. to about 400° F., filtered to remove the wash water, and then air dried at a temperature below the melting point of the polymer, i.e., at a temperature in the range of from about 200° F. to about 400° F., most preferably from about 250° F. to about 350° F. The particle size of the polymer is preferably reduced by milling with a conventional ball milling machine or the equivalent which further improves the processing properties of the polymer.

When poly(biphenylene sulfide) resin produced in accordance with the process of this invention is combined with a fiberous reinforcing material, a composite having superior mechanical properties and retention of such mechanical properties at high temperature is produced. The fiberous reinforcing material can be carbon fibers, glass fibers, aramid fibers, and the like with carbon fibers being the most preferred. The fibers can be present in a matrix of poly(biphenylene sulfide) resin in the form of one or more individual strands or rovings of fibers. The individual fibers in a strand will typically have a diameter in the range of from about 4 to about 10 microns and the strands or rovings can contain anywhere from about 1,000 to about 12,000 fibers.

In producing fiber composites utilizing the poly(biphenylene sulfide) resin of this invention, an aqueous slurry of the poly(biphenylene sulfide) resin produced as described above can be utilized for slurry impregnation of the reinforcing fibers. Generally, the particles in the slurry should have an average particle size of from about 2 microns to about 50 microns. The slurry is agitated and surfactant is added if required in order to provide a uniform dispersion. A strand or roving of reinforcing fibers is pulled through the slurry in a known manner whereby the fibers are impregnated with the resin in an amount in the range of from about 20% to about 80% by weight of the resulting fibers-resin mixture. The fibers are then at least partially dried and pulled through a hot forming die. The temperature of the forming die is sufficiently high for the resin to reach the molten state and form a matrix. The heated die has a cross-sectional dimension such that as the impregnated fiber-reinforcing material is pulled therethrough, the thermoplastic resin and fibers are consolidated into a composite. The resulting composite contains continuous unidirectionally aligned fibers, and depending upon the shape of the heated forming die, can be produced in the form of a bar, tape or sheet containing in the range of from about 20% to about 80% poly(biphenylene sulfide) resin by weight of the composite. The continuously pultruded composite can be pulled through a cutting apparatus whereby it is cut into articles of desired length.

Multi-ply laminated composites can be formed from the single-ply composites by heating and pressing at least two of the single-ply composites in a heated pressure mold. Generally, the poly(biphenylene sulfide) resin-impregnated reinforcing fibers are heated in the heated forming die to a temperature in the range of from about 840° F. to about 905° F. whereby the resin is melted and the resin and reinforcing fibers are consolidated. When multi-ply laminated composites are formed using a heated press mold, the mold is generally heated to a temperature in the same range, i.e., a temperature in the range of from about 840° F. to about 905° F.

As will be understood by those skilled in the art, the reinforcing fibers can be in forms other than strands or rovings, as for example in woven mats, and techniques other than pultrusion can be used for impregnating the fibers with resin and consolidating the resin and fibers into composites whereby the fibers are contained in a resin matrix.

In order to further illustrate the improved process of the present invention for producing biphenylene sulfide polymer the following examples are given.

EXAMPLE 1

Poly(biphenylene sulfide) resin prepared from 4,4'-difluorobiphenyl, N-methyl-2-pyrrolidone, sodium hydrosulfide and sodium hydroxide. In a typical 4-mole scale run, a 2-gallon stainless steel autoclave manufactured by Autoclave Engineers, Inc. equipped with a stirrer having a stirring speed of about 300 rpm was charged with 4 moles (380.2 grams) of aqueous sodium hydrosulfide solution (59.0% by weight), 4.12 moles (164.8 grams) of sodium hydroxide, 4 moles (760.8 grams) of 4,4'-difluorobiphenyl and 28.0 moles (2,376 milliliters) of N-methyl-2-pyrrolidone. The temperature was raised to 482° F. and held for one hour. The temperature was then raised to 572° F. and held for 2 hours. The pressure of the reactor reached about 360 psig at the end of the heating time period. The heating was discontinued and the autoclave and its contents were cooled overnight. The crude polymer product was washed and filtered 6 times with hot deionized water and dried in a forced air oven at 266° F. for one day or until constant weight. The typical yield was 739 grams.

For comparison purposes, poly(biphenylene sulfide) was prepared in the same manner except that 4,4'-dibromobiphenyl was utilized instead of 4,4'-difluorobiphenyl. In order to compare the thermal properties of the two resins, the melt temperatures of the resins were determined by pressing a quantity of each resin on a hot bar with a spatula. The temperature of the hot bar was varied until the resin melted in 10 seconds. The melting point and heat of fusion of the resins were also determined by differential scanning calorimetry. The results of these tests are given in Table I below.

TABLE I

| | Thermal Properties | |
|---|---|---|
| | Poly(biphenylene Sulfide) Resin Made From Difluorobiphenyl | Poly(biphenylene Sulfide) Resin Made From Dibromobiphenyl |
| Resin Melt Temperature[1], °F. | 824 | 788 |
| Resin Melt Temperature[2], °F. | 833 | 815 |
| Heat of Fusion[2], | 16.73 | 14.3 |

TABLE I-continued

| | Thermal Properties | |
|---|---|---|
| | Poly(biphenylene Sulfide) Resin Made From Difluorobiphenyl | Poly(biphenylene Sulfide) Resin Made From Dibromobiphenyl |
| cal./g. | | |

[1]Resin was pressed on a hot bar at different temperatures with a spatula until the resin melted in 10 sec.
[2]Determined by differential scanning calorimetry.

As indicated in Table I, the poly(biphenylene sulfide) resin made from 4,4'-difluorobiphenyl has a higher melting temperature than the resin made from 4,4'-dibromobiphenyl. The poly(biphenylene sulfide) resin produced from 4,4'-difluorobiphenyl was also more viscous on melting as compared to the resin made from 4,4'-dibromobiphenyl.

EXAMPLE 2

The pultrusion process and apparatus described in U.S. Pat. No. 4,680,224 issued July 14, 1987 to O'Connor was utilized for producing "prepreg" tape composite of carbon fiber and poly(biphenylene sulfide) resin made from 4,4'-difluorobiphenyl. The carbon fiber used was manufactured by Hercules, Inc. of Wilmington, Del. under the trade designation AS4. The particle size of the poly(biphenylene sulfide) resin was reduced to an average of about 11 microns prior to preparing a slurry thereof. Table II below shows the prepregging conditions for the poly(biphenylene sulfide)-carbon fiber composite, and for comparison purposes, the typical prepregging conditions for equivalent poly(phenylene sulfide) resin-carbon fiber composite.

TABLE II

| | Prepregging Conditions | |
|---|---|---|
| | Poly(biphenylene Sulfide) Made With 4,4'-difluoro-biphenyl | Poly(phenylene Sulfide) |
| Line Speed, in/min | 25 | >36 |
| Die Temperature | 825–870° F. | 600° F. |
| Drying Chamber Temperature | 1004° F. | 950° F. |
| Slurry Concentration, wt % | 6 | 15 |
| Average Particle Size, | 11 | 10–15 |
| Resin Content, wt. % of composite formed | 40 | 40 |
| Fiber Content, wt. % of composite formed | 60 | 60 |
| Prepreg Width, 3" die | 2.0–2.5" | 3" |
| Thickness, mils | 10–15 | 8 |

EXAMPLE 3

To assess the differences between poly(biphenylene sulfide) resins made from 4,4'-difluorobiphenyl and 4,4'-dibromobiphenyl, composites were made using plain weave carbon fiber mats. Slurries of the poly(biphenylene sulfide) resins were made by mixing 50-gram portions of the resins with 125 grams of water in a Waring blender. The slurries obtained were applied using a 1-inch paint brush on both sides of plain weave carbon fiber mats having sizes of about 2.5 inches by 6 inches. The carbon fiber mats were obtained from Hexcel Corporation. The resin-loaded fiber mats were dried in an oven at 292° F. for at least one hour. Four dried resin-fiber mats of the same resin were stacked, sandwiched between aluminum sheets and iron plates and subjected to 850° F. heat in a Pasadena press for 5 minutes with contact pressure. The fiber mats and iron plates were then transferred to an ambient temperature press and consolidated at 2 tons of pressure held for 3 minutes. Four of the 4-ply composite sheets obtained having thicknesses in the range of from about 30 to about 37 mils were then trimmed to fit into a 2.5 inch by 6 inch by 0.25 inch picture frame mold. The picture frame mold and composite sheets were sandwiched between 2 aluminum foils and iron plates and subjected to a temperature of about 850° F. to 860° F. in a Pasadena press with contact pressure for 10 minutes. The plates were then carefully transferred to an ambient temperature press and consolidated under 2 tons of pressure. The resulting 2.5 inch by 6 inch to 0.125 inch multi-ply composite was evaluated for mechanical properties in accordance with standard ASTM test procedures. For comparison purposes, a multi-ply composite using poly(phenylene sulfide/ketone) resin was made in exactly the same manner as described above and also tested. The results of the tests for the 3 composites are set forth in Table III below.

TABLE III

| Mechanical Properties of Plain Weave Carbon Fiber Composites | | | | |
|---|---|---|---|---|
| Temperature (°F.) | Flexural Modulus[2] (MSI) | Flexural Strength[2] (KSI) | Maximum Deflection[2] (inch) | Fiber Strain[2] (%) |
| Poly(biphenylene Sulfide) Resin Made From 4,4'-Difluorobiphenyl | | | | |
| 75 | 4.68 | 20.1 | .0325 | .006 |
| 550 | 4.71 | 25.3 | .039 | .007 |
| % retention[1] at 550° F. | 101 | 126 | | |
| Poly(biphenylene Sulfide) Resin Made From 4,4'Dibromobiphenyl | | | | |
| 75 | 3.95 | 16.5 | .04 | .007 |
| 550 | 2.21 | 13.2 | .07 | .012 |
| % retention[1] at 550° F. | 56 | 80 | | |
| Poly(phenylene Sulfide/Ketone) Resin | | | | |
| 75 | 2.66 | 41.2 | .1455 | .028 |
| 250 | 2.88 | 38.3 | .1195 | .023 |
| 350 | 1.53 | 19.8 | .35 | .066 |
| 550 | .71 | 8.74 | .441 | .083 |
| % retention[1] at 350° F. | 57 | 48 | | |
| % retention[1] at 550° F. | 27 | 21 | | |

[1]The properties were compared to properties at ambient temperature (75° F.).
[2]Determined in accordance with ASTM D790.

From Table III it can be seen that the poly(biphenylene sulfide) resin made from 4,4'-difluorobiphenyl had the best mechanical properties and the best retention of mechanical properties at 550° F. as compared to the same properties at ambient temperature.

EXAMPLE 4

Additional composites were prepared using poly(biphenylene sulfide) made from 4,4'-difluorobiphenyl as described in Example 3. The mechanical properties of the composites were tested at various temperatures in accordance with ASTM test procedures. The results of these tests are given in Table IV.

TABLE V

Mechanical Properites of Composites of
Fiber and Poly(biphenylene Sulfide) Resin
Made From 4,4'-Difluorobiphenyl at Various Temperatures
Longitudinal Flexural Properties[1]

| Temperature (°F.) | Flexural Modulus (MSI) | Flexural Strength (KSI) | Maximum Deflection (inch) | Fiber Strain (%) |
|---|---|---|---|---|
| 75 | 13.80 | 94.75 | .147 | .007 |
| 200 | 14.24 | 97.31 | .145 | .007 |
| 300 | 13.44 | 96.24 | .155 | .007 |
| 400 | 13.00 | 90.02 | .138 | .007 |
| 500 | 12.33 | 53.54 | .093 | .004 |
| 600 | 10.91 | 33.66 | .066 | .003 |
| Retention, % | | | | |
| 200 | 103.2 | 102.7 | 98.6 | 100.0 |
| 300 | 97.4 | 101.6 | 105.4 | 100.0 |
| 400 | 94.2 | 95.0 | 93.9 | 100.0 |
| 500 | 89.3 | 56.4 | 63.3 | 57.1 |
| 600 | 79.1 | 35.5 | 44.9 | 42.9 |

From Table IV it can be seen that the poly(biphenylene sulfide) resin-carbon fiber composites suffered no loss in mechanical properties until 400° F. where only a relatively small loss in flexural modulus and strength occurred. At temperatures above 400° F., more pronounced losses in mechanical properties were observed. However, even at 600° F. the composite still maintained 79% and 35% flexural modulus and strength, respectively.

What is claimed is:

1. An improved process for producing biphenylene sulfide polymer comprising the step of reacting difluorobiphenyl with an alkali metal sulfide in a polar organic compound at a temperature in the range of from about 260° F. to about 840° F. for a time sufficient to form a polymer consisting essentially of repeat units of the formula:

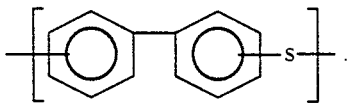

2. The process of claim 1 wherein said alkali metal sulfide is sodium sulfide.

3. The process of claim 2 wherein said sodium sulfide is formed in situ prior to said step of reacting by dissolving sodium hydrosulfide and sodium hydroxide in said polar organic compound.

4. The process of claim 3 wherein said polar organic compound is N-methyl-2-pyrrolidone.

5. The process of claim 4 wherein said time is in the range of from about 1 hour to about 8 hours.

6. The process of claim 5 which is further characterized to include the steps of:
washing said polymer formed in said step of reacting with hot water having a temperature in the range of from about 250° F. to about 450° F.; and
filtering said washed polymer.

7. The process of claim 6 which is further characterized to include the step of air drying said polymer recovered in said step of filtering at a temperature in the range of from about 200° F. to about 400° F.

8. An improved process for producing biphenylene sulfide polymer comprising the steps of:
(a) reacting difluorobiphenyl with an alkali metal sulfide in a polar organic compound at a temperature in the range of from about 260° F. to about 840° F. for a time sufficient to form a polymer consisting essentially of repeat units of the formula:

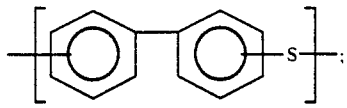

(b) washing said polymer with hot water;
(c) filtering said washed polymer; and
(d) air drying said filtered polymer at a drying temperature below the melting point of said polymer.

9. The process of claim 8 wherein said alkali metal sulfide is sodium sulfide.

10. The process of claim 9 wherein said sodium sulfide is formed in situ prior to step (a) by dissolving sodium hydrosulfide and sodium hydroxide in said polar organic compound.

11. The process of claim 10 wherein said polar organic compound is N-methyl-2-pyrrolidone.

12. The process of claim 11 wherein said temperature of step (a) is in the range of from about 480° F. to about 570° F.

13. The process of claim 12 wherein said time is in the range of from about 2 hours to about 6 hours.

14. The process of claim 13 wherein said hot water utilized for washing said polymer is at a temperature in the range of from about 300° F. to about 400° F.

15. The process of claim 14 wherein said drying temperature of step (d) is in the range of from about 250° F. to about 350° F.

16. An improved process for producing biphenylene sulfide polymer comprising the steps of:
(a) reacting difluorobiphenyl with sodium sulfide in methylpyrrolidone at a temperature of about 480° F. for about 1 hour followed by increasing the temperature to about 570° F. and maintaining the temperature at about 570° F. for an additional 2 hours to form a polymer consisting essentially of repeat units of the formula:

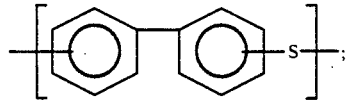

(b) washing said polymer with hot water having a temperature in the range of from about 300° F. to about 400° F.;
(c) filtering said polymer to separate wash water therefrom; and
(d) air drying said polymer at a temperature in the range of from about 250° F. to about 350° F.

17. The process of claim 16 which is further characterized to include the steps of:
(e) cooling said polymer dried in step (d); and
(f) milling said polymer cooled in step (e) to reduce the particle size thereof.

* * * * *

UNITED STATES PATENT AND TRADEMARK OFFICE
CERTIFICATE OF CORRECTION

PATENT NO. : 5,037,951

DATED : August 6, 1991

INVENTOR(S) : Michael C. Yu and Harold D. Yelton

It is certified that error appears in the above-identified patent and that said Letters Patent is hereby corrected as shown below:

Col. 4, line 26, after "resin" insert --was--;

Col. 7, Table V, line 1, change "TABLE V" to --TABLE IV--; and

Col. 7, Table IV, line 20, insert Footnote 1 --$^1$ Determined in accordance with ASTM D790.--

Signed and Sealed this

Eighth Day of December, 1992

*Attest:*

DOUGLAS B. COMER

*Attesting Officer*     *Acting Commissioner of Patents and Trademarks*